United States Patent

[11] 3,627,386

| [72] | Inventor | Peter Every<br>Livonia, Mich. |
|---|---|---|
| [21] | Appl. No. | 864,628 |
| [22] | Filed | Oct. 8, 1969 |
| [45] | Patented | Dec. 14, 1971 |
| [73] | Assignee | Kelsey-Hayes Company<br>Romulus, Mich. |

[54] FOUR-WHEEL SKID CONTROL SYSTEM
4 Claims, 1 Drawing Fig.

[52] U.S. Cl. .................................................. 303/21 F,
303/6 R, 303/61
[51] Int. Cl. ...................................................... B60t 8/02
[50] Field of Search ........................................... 188/181;
303/21, 24, 6, 61–63, 68–69

[56] References Cited
UNITED STATES PATENTS

| 3,449,019 | 6/1969 | Walker .................... | 303/21 |
| 3,477,765 | 11/1969 | Perrino ................... | 303/21 |
| 3,481,653 | 12/1969 | Grancon .................. | 303/21 |
| 3,503,655 | 3/1970 | Heimler ................... | 303/21 |
| 3,521,934 | 7/1970 | Leiber ..................... | 303/21 |
| 3,523,713 | 8/1970 | Okamoto et al. ......... | 303/21 |

*Primary Examiner*—Milton Buchler
*Assistant Examiner*—John J. McLaughlin
*Attorney*—Harness, Dickey and Pierce

ABSTRACT: In a skid control system for a brake system, a master cylinder actuates a pneumatic booster valve which controls a power booster. A hydraulic skid control valve is connected between the master cylinder and the power booster. A pneumatic skid control valve is connected between the pneumatic booster valve and the power booster. A control module actuable upon the occurrence of a skid condition to control the hydraulic and pneumatic skid control valves. Actuation of the hydraulic skid control valve cuts off communication between the master cylinder and power booster and connects the power booster to a reservoir. Actuation of the pneumatic skid control valve deactuates the power booster to release the brakes. When the skid signal is terminated a timeout circuit delays the return of the hydraulic skid control valve to its original position. This enables the power booster to be reactuated and to draw fluid from the reservoir.

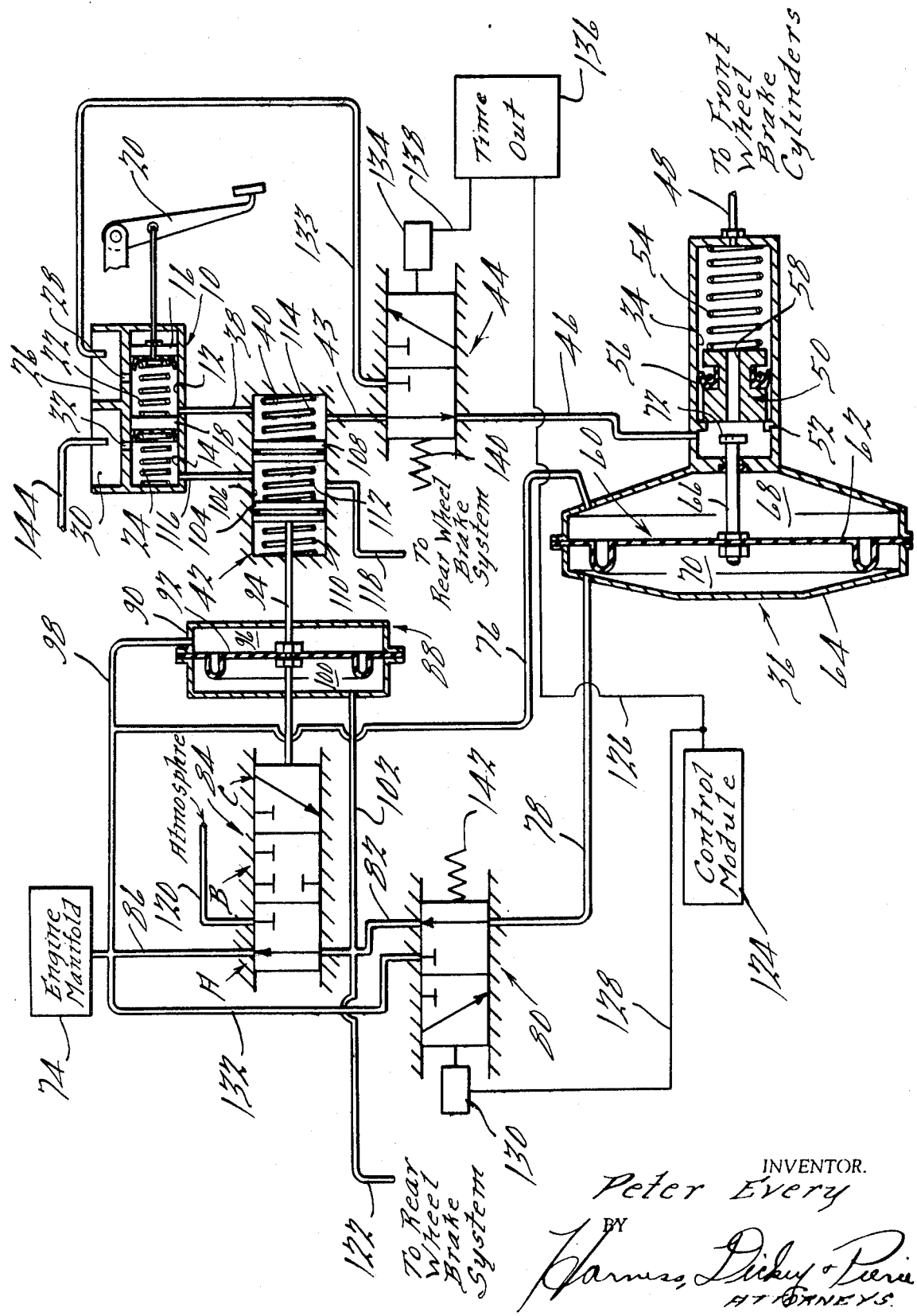

FOUR-WHEEL SKID CONTROL SYSTEM

SUMMARY BACKGROUND OF THE INVENTION

The present invention relates to a skid control system.

It would be desirable to provide a skid control system for controlling the four wheels of an automotive vehicle utilizing a minimum of apparatus such as modulating valves, etc. In the present invention skid control is provided by controlling power boosters for both the front and rear brake thereby resulting in a substantial simplification. Therefore, it is an object of the present invention to provide a novel four-wheel skid control system in which skid control is provided through control of a power booster which also functions during nonskid control periods as a brake booster.

It is an object of the present invention to provide a novel skid control system in which skid control is provided by controlling a power booster.

It is another object of the present invention to provide a novel skid control system.

Other objects, features, and advantages of the present invention will become apparent from the subsequent description and the appended claims, taken in conjunction with the accompanying drawing in which the drawing is a schematic drawing with some parts shown in elevation and with some parts shown in section and others shown broken away of a system exemplifying features of the present invention.

Looking now to the drawing, a conventional dual master cylinder 10 is shown as having a pair of separate fluid chambers 12 and 14 in which are located actuating pistons 16 and 18, respectively. The piston 16 is actuable by the vehicle operator via a brake pedal 20. The piston 18 is actuable via fluid pressure in chamber 12 and a pair of return springs 22 and 24. The dual master cylinder 10 has a first fluid reservoir 26 which is communicated with the cylinder 12 via a passage 28 and a second fluid reservoir 30 which is communicated with the chamber 14 via a passage 32. The chamber 12 is connected to a booster chamber 34 in a power booster assembly 36.

Fluid from chamber 12 is communicated via conduit 38 to a first chamber 40, in a hydraulic-actuating assembly 42 (to be described) and then directly to a conduit 43 and thence to a hydraulic skid control valve 44 and to fluid conduit 46 and thence to the chamber 34. Chamber 34 is connected to the brake cylinders of the front wheels via conduit 48.

The booster 36 includes an actuating piston 50 which is slidably supported within the chamber 34 and which is normally held against a stop 52 by a return spring 54. The piston 50 has an annular seal 56 to provide a seal with the chamber walls and is also provided with a through bore 58. The booster 36 also includes a flexible diaphragm member 62 supported in an enclosed container 64. An actuating rod 66 is connected to the diaphragm 62 and extends into the hydraulic chamber 34 and is slightly spaced away from the piston 50. Normally both sides 68 and 70 of the diaphragm 62 are maintained at vacuum and hence the piston or actuating rod 66 is normally disengaged from the piston 50, as shown in the drawing. Upon actuation of the booster 36 (in a manner to be described) air pressure is communicated to the one side 70 whereby the diaphragm 62 will be flexed to the right moving the actuating rod 66 against the piston 50. The actuating rod 66 has an engaging head and seal 72 which engages the rearward end of the piston 50 blocking the aperture 58 and at the same time moves the piston 50 to the right causing pressurization of the fluid in the remainder of the chamber 34 resulting in increase in pressure to the front brake cylinders. The booster 36 in this manner, will supplement or assist the normal pressure as applied via the pedal 20. Note that the aperture 58 in the piston 50 provides means for fluid from the master cylinder chamber 12 to readily communicate with the wheel cylinders and also provides safety means whereby in the event of failure of the booster 36 fluid communication to the master cylinder chamber 12 will still be available and the brakes can still be applied.

A source of vacuum, which can be at the engine manifold of the motor vehicle, is generally indicated by the numeral 74 and provides a source of vacuum for the system. The chamber 68 of the booster 36 is communicated thereto via a fluid line 76. The opposite chamber 70 is also connected to the engine manifold 74 via a fluid line 78 which is connected to a pneumatic skid control valve 80 (which operates in a manner to be described) and thence to a fluid line 82 which is connected to a pneumatic booster valve 84 and to engine manifold 74 via a fluid line 86 connected to the valve 84. The pneumatic booster valve 84 is actuated by a pilot pneumatic valve-actuating assembly 88. The valve actuator 88 includes a container 90 in which is suspended a diaphragm 92 which has a rod member 94 connected thereto and extending from opposite ends thereof. Rod 94 has one end connected to the valve 84 for actuation of the valve and has its opposite end connected to the hydraulic actuator assembly 42. One side 96 of the diaphragm 92 is connected to the vacuum of engine manifold 74 via a conduit 98 while the opposite side 100 is connected to engine manifold 74 via conduit 102 which is connected in common with the conduit 82. Thus normally both sides 96 and 100 will be maintained at vacuum and the diaphragm 92 will not be actuated and will be in a position as shown.

The rod 94 is connected to a first piston member 104 located in a chamber 106 which also houses a second piston 108. Pistons 104 and 108 are operatively connected together via springs 110, 112 and 114. The portion of the chamber 106 between the pistons 104 and 108 is communicated with the chamber 14 of the dual master cylinder 10 via conduit 116. An outlet conduit 118 is connected to the same cylinder portion and is connected to the rear wheel brake system, in a manner to be described.

The pneumatic booster valve 84 has three conditions as controlled by the position of the diaphragm 92 and hence of the rod 94. The three positions are generally indicated by the letters A, B and C. A conduit 120, communicated to atmospheric air, is connected to the valve 84. In the A position, when the brakes are not applied, conduits 82 and 102 are in direct communication with conduit 86 and hence with the vacuum from engine manifold 74. In this condition, in accordance with the prior description, both sides 96 and 100 of the pneumatic valve actuator 86 are held at vacuum and hence the assembly 86 is not actuated and likewise both sides 68 and 70 of the booster 36 are at vacuum and hence the booster 36 is not actuated. Upon application of the brakes via the pedal 20, pressurized fluid flows into the chamber 106 via the conduits 38 and 116 causing the piston 104 and hence the rod 94 to be moved to the left. Initially the valve 84 will be first moved to the B position which blocks conduit 86 from conduits 82 and 102 and upon further motion of the valve 84 will be placed in the C position in which the conduit 86 will still be blocked but atmospheric air via conduit 120 will be communicated to the conduits 82 and 102. Atmospheric air will then be communicated via line 78 to the one side 70 of the booster 36 causing actuation of the diaphragm assembly 60 to cause pressurization of the fluid to the brakes in the manner previously described. At the same time air pressure will be communicated to the side 100 of the valve actuator 88 via the fluid line 102. The air communication will be maintained until the pressure in the chamber 100 balances the force applied to the diaphragm 92 via the rod 94 in accordance with the pressure applied by the vehicle operator. When this occurs the valve 84 will be moved to the B position in which both vacuum and air will be disconnected from the lines 82 and 102. In this condition further actuation of the booster 36 will be stopped and the pressure to the brakes will then be at a magnitude which is proportional to the pressure as applied by the vehicle operator and as sensed by the pneumatic valve actuator 88. If an increase in braking is desired, and the operator depresses the pedal 20 further increasing fluid pressure from the dual master cylinder 10, the sequence will be repeated whereby the actuator 88 will be moved to place the booster actuating valve 84 again in its C position whereby atmospheric air again can be communicated to the booster 36 to provide a further increase in pressure to the brakes. When the proper applied pressure is attained, the valve actuator 88 will be actuated to again move the booster-actuating valve 84 into the B position maintaining the pressure to the brakes at the new level selected by the vehicle operator.

Note that with the arrangement shown, the force applied to the rod 94 will be generally the average pressure from chambers 12 and 14 of the dual master cylinder 10. In the event of failure of either the front or the rear fluid lines, the booster for the other system can still be actuated.

The fluid line 118 is communicated to a booster similar to the booster 36 through a hydraulic skid control valve similar to the valve 44, and thence to a booster, similar to the booster 36. At the same time a conduit 122, which is connected in common to conduits 82 and 102, is connected to the rear wheel brake booster through a pneumatic skid control valve, similar to the valve 80, and hence, the rear wheel brake system is controlled in a manner similar to that of the front wheel brake system.

A control module 124 is associated with the front wheel system and will sense an incipient skid condition occurring at the front wheels to provide an output signal. This can be done by sensing the deceleration rate of the front wheels or some other appropriate characteristic. A similar control module can be provided for the rear wheel system. Control module 124 transmits an output signal to the hydraulic skid control valve 44 via a conductor 126 and to the pneumatic skid control valve 80 via a conductor 128. The pneumatic valve 80 controls the booster 36. Conductor 128 can be connected to a valve actuating the mechanism, such as a solenoid 130, which is actuated upon the signal appearing at conductor 128 to move the skid control valve 80 to the alternate position shown.

The module 124 will provide a signal only when the brakes have been applied and hence when booster 36 is actuated and valve 84 is in its B or C position. In the alternate position of control valve 80, fluid lines 78 and 82 are disconnected and fluid line 78 is connected to vacuum (engine manifold 74) via a conductor 132. The air pressure present in the chamber 70 of booster 36 will then be relieved tending to deactuate the booster 36 and reduce its effort upon the piston 50 whereby rod 66 will be at least partially retracted. At the same time the hydraulic skid control valve assembly 44 will be shifted to its alternate position whereby the fluid lines 43 and 46 will be disconnected thereby disconnecting the fluid in the chamber 34 from the master cylinder chamber 12. At the same time, however, the fluid line 46 will then be connected to a fluid line 133 which is connected to the reservoir 26. Thus fluid on the opposite side of the piston 50 can be transmitted back to the reservoir 26. The valve 44 can be shifted to its alternate position by a solenoid 134 which is actuated in response to a skid control signal appearing at conductor 126 from the control module 124. The signal from control module 124 is transmitted to the solenoid 134 through a timeout circuit 136 and thence to the solenoid via conductor 138. A spring 140 normally will urge the hydraulic skid control valve 44 into the position as shown in the drawing while a spring 142 will normally urge the pneumatic skid control valve 80 into position as shown in the drawing. Upon spin-up of the wheels, the control module 124 will sense termination of the skid condition at the wheels and signals at conductors 126 and 128 will be terminated thereby deactuating the solenoid 130 and terminating the signal to the timeout circuit 136. The timeout circuit 136 provides a delay such that after termination of the signal at conductor 126, the solenoid 134 will be maintained energized for a preselected time thereby maintaining the skid control valve 44 in the actuated position whereby the rod end of chamber 34 will still be connected to reservoir 26. The time is selected to permit booster 36 to be reactuated, with valve 80 back in its original position, and to draw fluid back from the reservoir 26 as piston 50 is moved to the right again. If valve 44 were deactuated at the same time as valve 80, with the path open to chamber 12 of the master cylinder 10 and with the path to reservoir 26 closed, fluid would be drawn from chamber 12 to fill booster chamber 34 as the piston 50 was returned to the right; this could result in depletion of master cylinder fluid and loss of pedal. This is prevented by the time delay from timeout 136. Normally, several cycles of relief and reapplication of pressure are encountered in a skid-controlled stop. The timeout circuit 136 in conjunction with repeated skid signals from module 124 will result in cycling of the pneumatic control valve 80 while the valve 44 is held continuously actuated. Note that in the event that the valve 84 is in the B position, neither atmosphere or vacuum is connected to the fluid conduit 82; upon return of the valve 80 to its original position when the skid control signal is terminated, some of the air on the side 100 of the valve actuator 88 will be bled off into the chamber 70 whereby the valve 84 will be moved to its C position communicating atmosphere again to lines 82 and 102 permitting the brake pressure to begin to be reapplied via the booster 36.

A fluid line 144 is connected to reservoir 30 and to the hydraulic skid control valve (similar to line 133 and valve 44) for the rear brakes. Thus the rear brakes can be separately skid controlled in a manner similar to that described for the front brakes. The result is a simplified four-wheel brake system utilizing brake booster control.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A skid control system for a hydraulically actuated brake system of at least one wheel of a wheeled vehicle with the brake system including a master cylinder and a pneumatically actuated brake booster with the booster connected to the master cylinder, said control system comprising: sensing means for sensing the occurrence of an incipient skid condition at the wheel and for providing an output signal in response thereto, pneumatic skid control means actuable in response to said output signal for pneumatically actuating the booster to a condition to relieve hydraulic brake pressure, and hydraulic skid control means actuable in response to said output signal for relieving the hydraulic fluid pressure at the booster and comprising time delay means for maintaining said hydraulic skid control means actuated for a preselected time after deactuation of said pneumatic skid control means, whereby said pneumatic skid control means can be repetitively actuated and deactuated with said hydraulic skid control means maintained actuated.

2. A skid control system for a hydraulically actuated brake system of at least one wheel of a wheeled vehicle with the brake system including a master cylinder and a pneumatically actuated brake booster with the booster connected to the master cylinder, said control system comprising sensing means for sensing the occurrence of an incipient skid condition at the wheel and for providing an output signal in response thereto, pneumatic skid control means actuable in response to said output signal for pneumatically actuating the booster to a condition to relieve hydraulic brake pressure, and hydraulic skid control means actuable in response to said output signal for relieving the hydraulic fluid pressure at the booster, the outlet from the master cylinder normally being connected to the booster and with said hydraulic skid control means when actuated disconnecting the booster from the outlet and connecting the booster to the reservoir for the master cylinder, a booster-actuating valve having a first condition deactuating the booster, a second condition actuating the booster and a third condition holding the booster at the degree of actuation it is in at that time, valve-actuating means connected to the booster for actuating said actuating valve into its various conditions, said valve-actuating means being responsive to fluid pressure from actuation of the master cylinder for actuating said actuating valve to said second condition, said valve-actuating means connected to the output of said actuating valve and being pneumatically actuable into said third condition in response to a pneumatic pressure indicative of the pneumatic pressure at the booster and indicative of the applied hydraulic pressure from the master cylinder whereby the degree of actuation of the booster will be a function of the applied hydraulic master cylinder pressure, said pneumatic skid control means comprising a skid control valve interposed between the booster and both said actuating means and the pneumatic circuit for said valve-actuating means, said hydraulic skid control means comprising time delay means for maintaining said hydraulic skid control means actuated for a preselected time after deactuation of said pneumatic skid control means whereby said pneumatic skid control means can be repetitively actuated and deactuated with said hydraulic skid control means maintained actuated.

3. The system of claim 2 in combination with a second skid control system for a second brake system for a second wheel and including a second booster and second sensing means and second pneumatic and hydraulic skid control means similar to the first-mentioned sensing means and pneumatic and hydraulic skid control means.

4. The system of claim 2 in combination with a second skid control system for a second brake system for a second wheel and including a second booster and second sensing means and second pneumatic and hydraulic skid control means similar to the first-mentioned sensing means and pneumatic and hydraulic skid control means.

* * * * *

UNITED STATES PATENT OFFICE
CERTIFICATE OF CORRECTION

Patent No. 3,627,386            Dated Dec. 14, 1971

Inventor(s) Peter Every

It is certified that error appears in the above-identified patent and that said Letters Patent are hereby corrected as shown below:

Column 1, line 52, after "a" insert
-- pneumatically actuated diaphragm
assembly 60 which includes --

Signed and sealed this 6th day of June 1972.

(SEAL)
Attest:

EDWARD M. FLETCHER, JR.
Attesting Officer

ROBERT GOTTSCHALK
Commissioner oo Patents